United States Patent
Bell et al.

(10) Patent No.: US 11,498,263 B2
(45) Date of Patent: Nov. 15, 2022

(54) CALIBRATION AND ALIGNMENT OF 3D PRINTING DEPOSITION HEADS

(71) Applicant: Kornit Digital Technologies Ltd., Rosh HaAyin (IL)

(72) Inventors: Michael Austin Bell, Somerville, MA (US); Kyle Jackson Dumont, Arlington, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 98 days.

(21) Appl. No.: 16/565,006

(22) Filed: Sep. 9, 2019

(65) Prior Publication Data

US 2020/0171811 A1 Jun. 4, 2020

Related U.S. Application Data

(63) Continuation of application No. 15/242,102, filed on Aug. 19, 2016, now Pat. No. 10,406,801.

(60) Provisional application No. 62/208,227, filed on Aug. 21, 2015.

(51) Int. Cl.
  *B29C 64/112* (2017.01)
  *B33Y 40/00* (2020.01)
  *B33Y 10/00* (2015.01)
  *B33Y 30/00* (2015.01)
  *B33Y 50/02* (2015.01)

(52) U.S. Cl.
  CPC ............ *B29C 64/112* (2017.08); *B33Y 10/00* (2014.12); *B33Y 30/00* (2014.12); *B33Y 40/00* (2014.12); *B33Y 50/02* (2014.12)

(58) Field of Classification Search
  None
  See application file for complete search history.

(56) References Cited

U.S. PATENT DOCUMENTS

| | | | |
|---|---|---|---|
| 5,088,047 A | 2/1992 | Bynum | |
| 6,021,358 A | 2/2000 | Sachs | |
| 7,922,939 B2 | 4/2011 | Lewis et al. | |
| 8,017,055 B2 | 9/2011 | Davidson et al. | |
| 8,175,734 B2 | 5/2012 | Fogel et al. | |
| 2006/0155418 A1 | 7/2006 | Bradbury et al. | |
| 2007/0228592 A1* | 10/2007 | Dunn | B29C 64/106 264/113 |
| 2011/0222081 A1 | 9/2011 | Yi et al. | |

(Continued)

FOREIGN PATENT DOCUMENTS

| CN | 103660300 | 3/2014 |
|---|---|---|
| CN | 203650991 | 6/2014 |

(Continued)

OTHER PUBLICATIONS

International Preliminary Report on Patentability dated Mar. 8, 2018 From the International Bureau of WIPO Re. Application No. PCT/US2016/047845.

(Continued)

*Primary Examiner* — Michael P. Rodriguez

(57) ABSTRACT

A three-dimensional (3D) printer includes a frame, a first calibration device coupled to the frame, a dispensing system having a cartridge holder with a sensor mounted at a location relative to the cartridge holder, and a multi-axis positioning system for moving the dispensing system relative to the frame. Methods for calibrating the 3D printer are also disclosed.

4 Claims, 12 Drawing Sheets

(56) References Cited

U.S. PATENT DOCUMENTS

| | | |
|---|---|---|
| 2012/0208378 A1 | 8/2012 | Rudisill et al. |
| 2013/0015596 A1 | 1/2013 | Mozeika et al. |
| 2013/0040091 A1 | 2/2013 | Dikovsky et al. |
| 2013/0096708 A1 | 4/2013 | Danks |
| 2013/0164960 A1 | 6/2013 | Swanson et al. |
| 2013/0242317 A1 | 9/2013 | Leavitt et al. |
| 2013/0310965 A1 | 11/2013 | Schouwenburg |
| 2013/0323941 A1 | 12/2013 | Zeliff et al. |
| 2014/0031967 A1 | 1/2014 | Unger et al. |
| 2014/0107823 A1 | 4/2014 | Huang |
| 2014/0129021 A1 | 5/2014 | Boynton et al. |
| 2014/0156053 A1 | 6/2014 | Mahdavi et al. |
| 2014/0218883 A1 | 8/2014 | Dakhiya et al. |
| 2014/0253547 A1 | 9/2014 | Schmidt |
| 2014/0253548 A1 | 9/2014 | Schmidt |
| 2014/0253549 A1 | 9/2014 | Bachrach et al. |
| 2014/0253550 A1 | 9/2014 | Bachrach et al. |
| 2014/0291886 A1 * | 10/2014 | Mark .............. B29C 69/001 264/163 |
| 2014/0336808 A1 | 11/2014 | Taylor et al. |
| 2015/0045928 A1 | 2/2015 | Perez et al. |
| 2015/0147424 A1 * | 5/2015 | Bibas .............. B29C 64/112 425/150 |
| 2016/0193785 A1 | 7/2016 | Bell et al. |
| 2017/0050383 A1 | 2/2017 | Bell et al. |

FOREIGN PATENT DOCUMENTS

| | | |
|---|---|---|
| CN | 204020013 | 12/2014 |
| EP | 2128936 | 12/2009 |
| GB | 2387921 | 10/2003 |
| WO | WO 00/52624 | 9/2000 |
| WO | WO 2013/163585 | 10/2013 |
| WO | WO-2014/209994 | 12/2014 |
| WO | WO 2015/017579 | 2/2015 |
| WO | WO 2015/060923 | 4/2015 |
| WO | WO 2015/077195 | 5/2015 |
| WO | WO 2017/035007 | 3/2017 |

OTHER PUBLICATIONS

International Search Report and the Written Opinion dated Jan. 30, 2017 From the International Searching Authority Re. Application No. PCT/US2016/047845. (17 Pages).
Corrected Notce of Allownace dated Aug. 7, 2019 From the US Patent and Trademark Office Re. U.S. Appl. No. 15/242,102. (5 Pages).
Examiner-Initiated Interview Summary dated Jun. 5, 2019 From the US Patent and Trademark Office Re. U.S. Appl. No. 15/242,102. (1 Page).
International Preliminary Report on Patentability dated May 6, 2016 From the International Bureau of WIPO Re. Application No. PCT/US2015/068107. (14 Pages).
International Search Report and the Written Opinion dated Jul. 5, 2016 From the International Searching Authority Re. Application No. PCT/1US2015/0688323. (18 Pages).
Invitation to Pay Additional Fees, Communication Relating to the Results of the Partial International Search and the Provisional Opinion dated Apr. 26, 2016 From the International Searching Authority Re. Application No. PCT/US2015/068323. (9 Pages).
Notce of Allownace dated Jun. 14, 2019 From the US Patent and Trademark Office Re. U.S. Appl. No. 15/242,102. (7 Pages).
Official Action dated Dec. 14, 2018 From the US Patent and Trademark Office Re. U.S. Appl. No. 15/242,102. (10 Pages).
Restriction Official Action dated May 4, 2018 From the US Patent and Trademark Office Re. U.S. Appl. No. 15/242,102. (7 Pages).

* cited by examiner

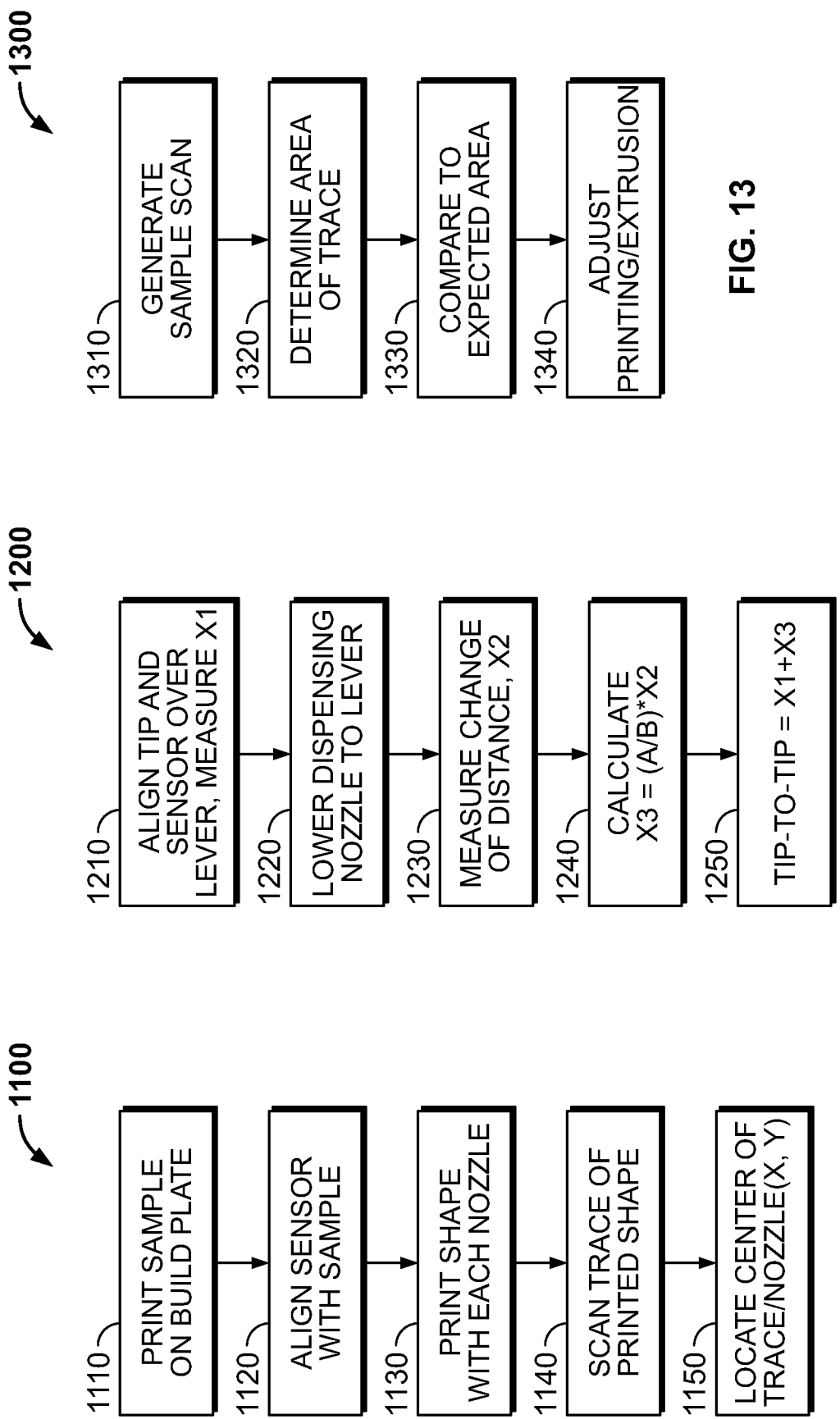

CALIBRATION AND ALIGNMENT OF 3D PRINTING DEPOSITION HEADS

RELATED APPLICATION

This application is a continuation of U.S. patent application Ser. No. 15/242,102, filed Aug. 19, 2016, which claims priority to U.S. Provisional Patent Application No. 62/208,227, filed Aug. 21, 2015, which are incorporated herein by reference in their entirety.

FIELD OF THE INVENTION

Embodiments of the invention relate to systems for and methods of three-dimensional (3D) printing and, more specifically, to a calibration and alignment system for each deposition head of a 3D printer for aligning each deposition head in (x, y, z) space.

BACKGROUND

To produce precise 3D parts or objects by 3D printing, calibration or alignment of the one or more dispensing (deposition or printing) heads (hereinafter also referred to as dispensing tips or nozzles, or dispensing tips/nozzles) is required. Alignment of one or more dispensing tips and a printing substrate, e.g., a build surface, is challenging due to the myriad of variables that may cause misalignment or position errors. More specifically, before initiation of a printing operation or job and during a printing operation, each tip opening of each dispensing tip is preferably aligned—and remains aligned in the x-, y-, and z-dimensions of the build volume of the 3D printer. Moreover, when the 3D printer includes a deposition system having two or more deposition cartridges, each cartridge having its own dispensing tip, there is a relative offset distance from nominal for each dispensing tip.

Some conventional 3D printers rely on a factory-installed, mechanically fixed dispensing tip position, while others require manually adjusting each dispensing tip relative to the build surface, as well as to every other dispensing tip. Problematically, in most instances, x- and y-offsets between dispensing tip or nozzle locations are typically found experimentally, and the offset values are manually input into the path plan or other 3D printing software.

Typical methods for z-axis alignment and registration of dispensing tips may include manual adjustment, a physical switch that the tip touches, and/or mounting a sensor, e.g., a capacitive or inductive sensor, adjacent and proximate to the tip and aligning the sensor with or to the build surface. Disadvantageously, mounting a sensor requires precise factory calibration of the sensor with respect to the tip, which may be further affected when deposition cartridges are replaceable. Wear of the 3D printing system due to use, inadvertent impact of a tip, environmental temperature changes, and other factors may result in additional alignment and position errors.

SUMMARY

Accordingly, there is a need for a reliable 3D printer and printing system adapted to print, e.g., extrude, precise objects. One embodiment uses a sensor mounted relative to, e.g., parallel, each of the dispensing tips, and a calibration device mounted on a frame to measure the x-, y-, and z-axis offset of each tip with respect to a global coordinate system, e.g., the printer frame or build plate, and each other.

In a first aspect, embodiments of the present invention relate to an apparatus for 3D printing. In some embodiments, the apparatus may include a build plate; a frame; a first calibration device coupled to the frame; a dispensing system including a cartridge holder and a sensor, mounted at a location relative to the cartridge holder; a sensor; and a multi-axis positioning system for moving the dispensing system relative to the frame.

In some implementations, the first calibration device may be a lever and a fulcrum. The lever may be T-shaped or polygonal-shaped. The lever may be formed from wood, metal, aluminum, spring steel, brass steel, ceramic, plastic, and/or phenolic material.

The dispensing system may include a first cartridge disposed in the cartridge holder, with the first cartridge including a first dispensing tip. The first calibration device may include a lever and a fulcrum and may be disposed such that, in a calibration position of the dispensing system, the first dispensing tip is disposed in registration with a proximal end of the lever and the sensor is disposed in registration with a distal end of the lever. The sensor may measure or sense a change in vertical position of the distal end of the lever when the first dispensing tip depresses the proximal end of the lever. A processing device may be configured to receive change in vertical distance data measured by the sensor to determine a vertical working height of the first dispensing tip.

A second cartridge may be disposed in the cartridge holder and include a second dispensing tip. Each of the cartridges may include a reservoir for holding a printing material, with at least one of the printing material in the first cartridge differing from the printing material in the second cartridge and an opening of the dispensing tip in the first cartridge differing from an opening of the dispensing tip in the second cartridge.

One or both cartridges may hold feedstock of thermoplastic as the printing material, and the feedstock in one cartridge may be different from the feedstock in the other cartridge.

In some implementations, the apparatus may include a second calibration device coupled to the frame and including a second lever and a second fulcrum. In a second calibration position of the dispensing system, the second dispensing tip may be disposed in registration with the proximal end of the second lever and the sensor is disposed above and in registration with the distal end of the second lever. The sensor may measure or sense a change in vertical distance of the distal end of the second lever when the second dispensing tip depresses the proximal end of the second lever. In some variations, the sensor may be disposed on the dispensing system at a point of symmetry between the first dispensing tip and the second dispensing tip.

A processing device may be configured to receive sensor output to determine a vertical working height of the second dispensing tip. The processing device may be configured to determine a vertical offset distance between the first and the second dispensing tips.

In another embodiment, the first calibration device may include a U-shaped fluid tube adapted to contain a displaceable fluid, and having a first open end disposed to register with the first dispensing tip and a second open end disposed to register with the sensor.

A heat removal device, e.g., a fan, may be included for cooling the dispensing system.

The sensor may be, e.g., a laser distance sensor, a laser point sensor, a laser line sensor, a laser three-dimensional sensor, an imaging device, a charge coupled device (CCD)

image sensor, a photodiode, a photoresistor, a phototransistor, or a fluoride optical element.

A second sensor, e.g., an optical sensor, a capacitive plate sensor, a capacitive wire sensor, and/or a Hall effect sensor may be adapted to determine a level of a liquid material disposed within a cartridge in the cartridge holder. In some variations, the Hall effect sensor may include a magnet portion disposable in a plunger translatable within a syringe and adapted to register a surface of the liquid as the liquid in the syringe is drawn down.

A cap for covering an open, distal end of the dispensing tip may be provided.

In another aspect, embodiments of the invention relate to a method for calibrating a three-dimensional printer including a frame, a first calibration device coupled to the frame, a dispensing system including a first dispensing tip, and a sensor. The first dispensing tip is positioned in registration with a first end of the first calibration device. The sensor is positioned in registration with a second end of the first calibration device. The first end of the first calibration device is depressed with the first dispensing tip. The sensor senses a change in vertical position of the second end of the first calibration device. A vertical working height of the first dispensing tip is thereby determined.

One or more of the following features may be included. The three-dimensional printer may include a second calibration device coupled to the frame and the dispensing system may include a second dispensing tip. The second dispensing tip may be positioned in registration with a first end of the second calibration device. The sensor may be positioned in registration with a second end of the second calibration device. The first end of the second calibration device may be depressed with the second dispensing tip. The sensor may sense a change in vertical position of the second end of the second calibration device. A vertical working height of the second dispensing tip may be determined. The first calibration device and the second calibration device may be a single calibration device. A relative vertical (z) offset distance between the first dispensing tip and the second dispensing tip may be determined.

In still another aspect, embodiments of the invention relate to a method for calibrating a three-dimensional printer. A first object is printed on a build plate of the three-dimensional printer with a first dispensing tip, the three-dimensional printer also including dispensing system having a sensor mounted thereon. The first object is scanned with the sensor.

One or more of the following features may be included. Scanning the first object includes determining a thickness of the first object. The determined thickness of the first object is compared to an expected thickness. The printing, scanning, and comparing steps are repeated until the determined thickness of the scanned object equals the expected thickness within a predetermined tolerance.

The dispensing system may include a second dispensing tip. A second object may be printed on the build plate with the second dispensing tip. The first and second objects may be scanned with the sensor. The scanning data collected with the sensor may be used to determine an (x, y) offset between each dispensing tip.

In another aspect, embodiments of the present invention relate to a method for determining a position of a dispensing tip disposed in a dispensing system of a 3D printer. In some variations, the 3D printer may include a build plate and a calibration device integrated into the build plate, while the dispensing system may include the dispensing tip and a sensor. In some embodiments, the method may include positioning the dispensing tip above and in registration with a first end of the calibration device; positioning the sensor above and in registration with a second end of the calibration device; at least one of lowering the dispensing tip and raising the build plate until the dispensing tip contacts the first end; measuring, by the sensor, a change in vertical distance of the second end rising upon contact of the dispensing tip at the first end; and determining a vertical working height of the dispensing tip. In some implementations, lowering the dispensing tip and/or raising the build plate until the dispensing tip first contacts the first end may include comparing a vertical distance measured at the sensor to at least one of a vertical lowering distance of the dispensing tip and a vertical raising distance of the build plate; and continuing to lower the dispensing tip and/or raise the build plate until the vertical distance measured at the sensor equals at least one of the vertical lowering distance of the dispensing tip and the vertical raising distance of the build plate.

In yet another aspect, embodiments of the present invention relate to a non-transitory computer program product embodied on a computer-readable medium and including computer code for 3D printing using a 3D printer including a build plate and a calibration device integrated into the build plate and a dispensing system including a dispensing tip and a sensor. In some embodiments, the code may include instructions executable by a processing device for positioning the dispensing tip above and in registration with a first end of the calibration device; positioning the sensor above and in registration with a second end of the calibration device; at least one of lowering the dispensing tip and/or raising the build plate until the dispensing tip contacts the first end; measuring, by the sensor, a change in vertical distance of the second end rising upon contact of the dispensing tip at the first end; and determining a vertical working height of the dispensing tip. In some implementations, the code for lowering the dispensing tip and/or raising the build plate until the dispensing tip contacts the first end may include comparing a vertical distance measured at the sensor to a vertical lowering distance of the dispensing tip and/or to a vertical raising distance of the build plate; and continuing to lower the dispensing tip and/or raise the build plate until the vertical distance measured at the sensor equals the vertical lowering distance of the dispensing tip and/or the vertical raising distance of the build plate.

In still another aspect, embodiments of the present invention relate to a method for determining relative offset distances (x, y, z) between plural dispensing tips disposed in a dispensing system of a 3D printer. In some variations, the 3D printer may include a build plate and a calibration device integrated into the build plate, while the dispensing system may include a sensor mounted thereon. In some embodiments, the method may include successively positioning each dispensing tip above and in registration with a first end of the calibration device; positioning the sensor above and in registration with a second end of the calibration device for each successive positioning; lowering each dispensing tip to contact with the first end; measuring, by the sensor, a change in vertical distance of the second end rising upon contact of the dispensing tip at the first end; determining a vertical working height of each dispensing tip; and determining a relative vertical (z) offset distance between the dispensing tips. In some implementations, the method also may include calibrating the sensor to a sample feature on the build plate; printing an object on a surface of the build plate with each of the dispensing tips; and scanning, by the sensor, each object to determine an (x, y) offset between each dispensing tip.

In a further aspect, embodiments of the present invention relate to a non-transitory computer program product embodied on a computer-readable medium and including computer code for determining relative offset distances (x, y, z) between each of a plurality of dispensing tips disposable on a removable dispensing cartridge of a 3D printer. In some variations, the printer includes a build plate and a calibration device integrated into the build plate and the dispensing tip or nozzle includes a sensor. In some embodiments, the code includes instructions executable by a processing device for successively positioning each dispensing tip above and in registration with a first end of the calibration device; positioning the sensor above and in registration with a second end of the calibration device for each successive positioning; lowering each dispensing tip to contact with the first end; measuring, by the sensor, a change in vertical distance of the second end rising upon contact of the dispensing tip at the first end; determining a vertical working height of each dispensing tip; and determining a relative vertical (z) offset distance between the dispensing tips. In some variations, the code may include instructions for calibrating the sensor to a sample feature on the build plate; printing an object on a surface on the build plate with each of the dispensing tips; and scanning, by the sensor, each object to determine an (x, y) offset between each dispensing tip relative to the sensor.

In another aspect, embodiments of the present invention relate to a method for calibrating material flow during 3D printing by a 3D printer. In some variations, the printer may include a build plate and a calibration device integrated into the build plate, while a dispensing system may include a dispensing tip(s) and a sensor. In some embodiments, the method may include printing an object on a surface on the build plate with each dispensing tip(s); scanning the object, by the sensor, to determine a thickness of the object; comparing the determined thickness of the object to an expected thickness; and adjusting a material flow rate and repeating the printing, scanning, and comparing steps until the determined thickness of the scanned object substantially equals the expected thickness.

In a still another aspect, embodiments of the present invention relate to a non-transitory computer program product embodied on a computer-readable medium and including computer code for calibrating material flow during 3D printing by a 3D printer. In some variations, the 3D printer may include a build plate, a calibration device integrated into the build plate, and a removable dispensing system, including a dispensing tip(s) and a sensor. In some embodiments, the code may include instructions executable by a processing device for printing an object on a surface of the build plate with each dispensing tip; scanning the object, by the sensor, to determine a thickness of the object; comparing the determined thickness of the object to an expected thickness; and adjusting a material flow rate and repeating the printing, scanning, and comparing steps until the determined thickness of the scanned object substantially equals the expected thickness.

In a further aspect, embodiments of the present invention relate to a dispensing system for 3D printing. In some embodiments, the dispensing system may include a first dispensing tip in fluid communication with a fluid reservoir adapted to contain an electrically conductive liquid material, and a sensor adapted to determine a level of the electrically conductive liquid material disposed within the fluid reservoir.

One or more of the following features may be included. The liquid material sensor may be an optical sensor, a capacitive plate sensor, a capacitive wire sensor, and/or a Hall effect sensor. In some implementations, the Hall effect sensor may include a magnet portion disposable in a plunger and adapted to register a surface of the liquid during draw down. The capacitive plate sensor may include a sheet of conductive material disposed proximate the fluid reservoir. In other variations, the capacitive wire sensor may include a wire of conductive material disposed proximate the fluid reservoir.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 11 is a flow chart of a method for locating the (x, y) center of a dispensing tip in accordance with some embodiments of the present invention;

FIG. 12 is a flow chart of a method for determining the tip-to-tip (z) height difference between a dispensing tip and a sensor in accordance with some embodiments of the present invention; and FIG. 13 is a flow chart of a method for adjusting material flow during a printing operation in accordance with some embodiments of the present invention.

DETAILED DESCRIPTION

Embodiments of the invention include a 3D printer and 3D printing system that include the system, hardware, electronics, input materials, and at least a portion of the software needed to three-dimensionally print an object and, more specifically, to three-dimensionally print an object with a highly accurate alignment in (x, y, z) space within the work volume of the 3D printer. Advantageously, the 3D printer uses a calibration device and sensor to determine a precise location of at least one dispensing head in (x, y, z) space.

3D Printing Device

Figure 1:
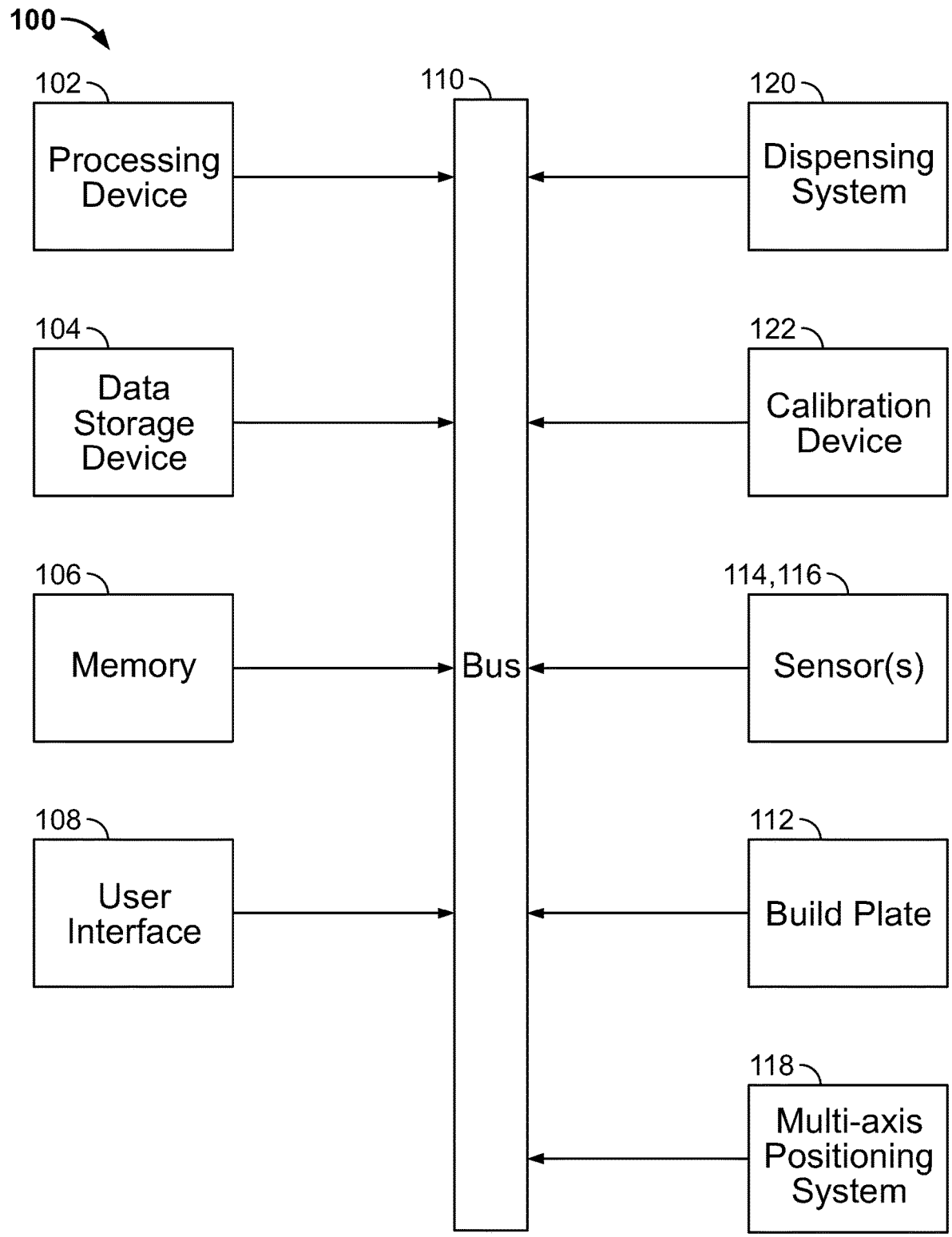
FIG. 1 is a block diagram of an illustrative embodiment of a 3D printer in accordance with an embodiment of the present invention.

Referring to FIG. 1, a block diagram of an illustrative embodiment of an exemplary 3D printer 100 is shown. Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer storage media including memory storage devices.

In some embodiments, the 3D printer 100 may include a processing device 102, a data storage device 104, memory 106, and a user interface 108. The processing device 102 may be adapted to perform or execute a series of instructions, e.g., an application, an algorithm, a driver program, and the like, that result in manipulated data. Examples of suitable processing devices 102 including, for the purpose of illustration and not limitation, network appliances, personal computers, workstations, mainframes, networked clients, servers, media servers, application servers, database servers, and web servers. The processing device 102 may be a commercially available processor such as an Intel Core, Motorola PowerPC, MIPS, UltraSPARC, or Hewlett-Packard PA-RISC processor, but also may be any type of available processing device 102 or controller.

Certain aspects and functions of embodiments of the present invention may be located on a single processing device 102 or may be distributed among a plurality of processing devices 102 connected via a bus 110 and/or one or more communications networks. The invention is not limited to executing on any particular system or group of systems. Moreover, aspects may be implemented in software, hardware, or firmware, or any combination thereof. Thus, aspects in accordance with the present invention may be implemented within methods, acts, systems, system elements, and components using a variety of hardware and software configurations, and the invention is not limited to any particular distributed architecture, network, or communication protocol.

Typically, a processing device 102 executes an operating system that may be, for example, a Windows-based operating system (e.g., Windows 7, Windows 2000 (Windows ME), Windows XP operating systems, and the like) available from the Microsoft Corporation of Seattle, Wash.; a MAC OS System X operating system available from Apple Computer of Cupertino, Calif.; a Linux-based operating system distributions (e.g., the Enterprise Linux operating system) available from Red Hat, Inc. of Raleigh, N.C.; or a UNIX operating system available from various sources. Many other operating systems may be used, and embodiments are not limited to any particular implementation. Operating systems conventionally may be stored in memory 106.

The processing device 102 and the operating system together define a processing platform for which application programs in high-level programming languages may be written. These component applications may be executable, intermediate (for example, C–) or interpreted code, which communicate over a communications network (for example, the Internet) using a communication protocol (for example, TCP/IP). Similarly, aspects in accordance with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used.

For instance, aspects of the system may be implemented using an existing commercial product, e.g., Database Management Systems, such as SQL Server available from Microsoft of Seattle, Wash., and Oracle Database from Oracle of Redwood Shores, Calif. or integration software such as Web Sphere middleware from IBM of Armonk, N.Y.

However, a processing device 102 running, for example, SQL Server may be able to support both aspects in accordance with the present invention and databases for sundry applications not within the scope of the invention. In one or more of the embodiments of the present invention, the processing device 102 may be adapted to execute at least one application, algorithm, driver program, and the like. The applications, algorithms, driver programs, and the like that the processing device 102 may process and may execute can be stored in memory 106.

Memory 106 may be used for storing programs and data during operation of the processing device 102. Memory 106 may include multiple components or elements of a data storage device(s) 104 or, in the alternate, may be a stand-alone device. More particularly, memory 106 may include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize memory 106 into particularized and, in some cases, unique structures to perform the aspects and functions disclosed herein. Advantageously, memory 106 may include software for 3D modeling and tip path-planning for 3D printing purposes.

User-input interfaces 108, e.g., graphical user interfaces (GUI) and the like, provide a vehicle for human interaction, with a machine, e.g., the processing device 102, in which the human user provides input to direct the machine's actions while the machine provides output and other feedback to the user for use in future input. User-input interfaces 108 are well known to the art and are not described in detail here.

Components of the 3D printer 100 may be coupled by an interconnection element such as a bus 110. The bus 110 may include one or more physical busses, e.g., between components that are integrated within a same machine, but may also include any communication coupling between system elements, e.g., specialized or standard computing bus technologies such as IDE, SCSI, PCI, and InfiniBand. Thus, the bus 110 enables communications, e.g., the transfer of data and instructions, to be exchanged internally, between 3D printer 100 components.

Figure 2:
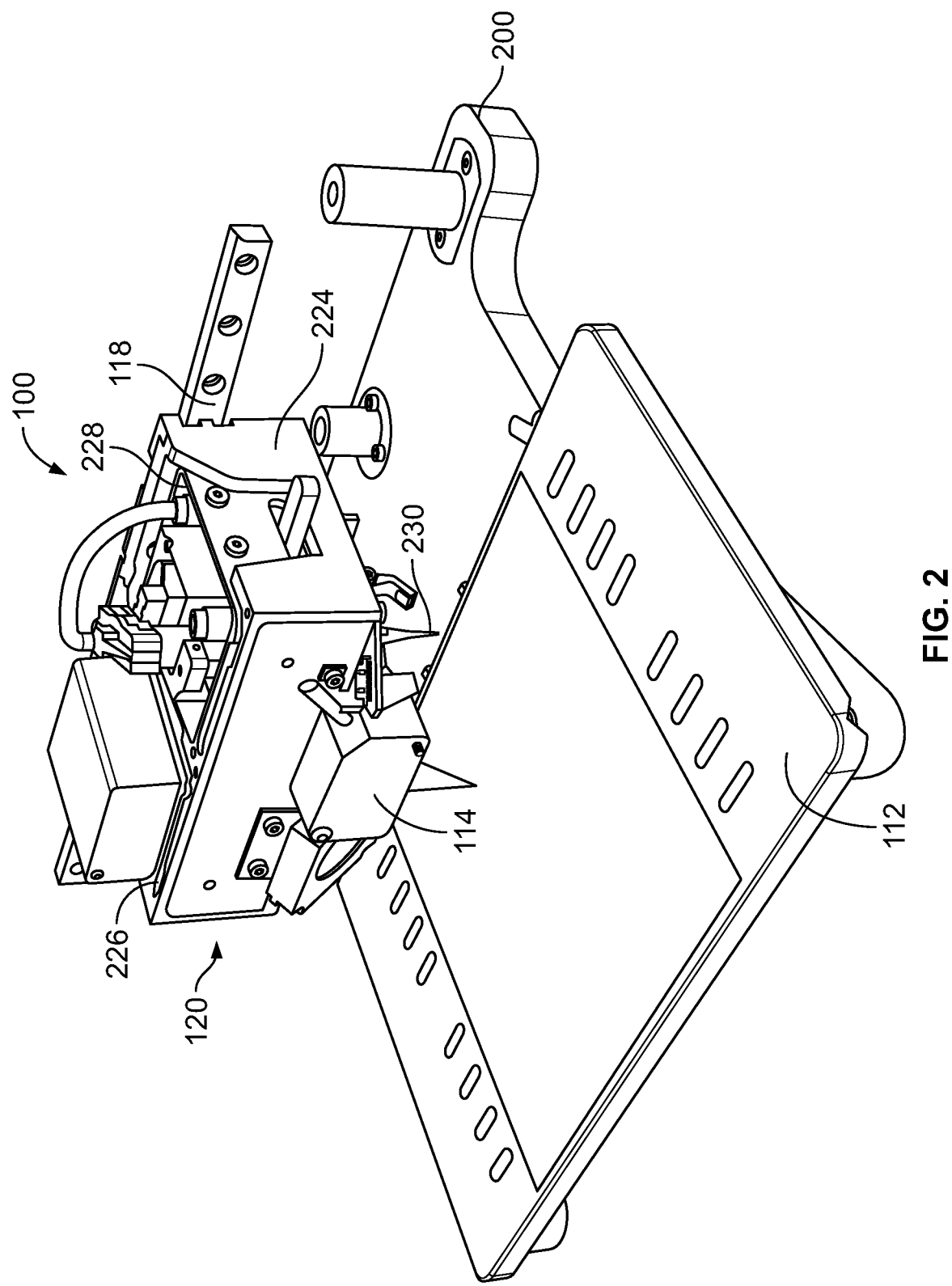
FIG. 2 is a perspective view of an illustrative embodiment of a 3D printer accordance with an embodiment of the present invention.

In addition to the processing device 102, data storage device 104, memory 106, and user interface 108, in some embodiments, as shown in FIGS. 1 and 2, the 3D printer 100 may include a build plate 112, one or more sensors 114, 116, a multi-axis positioning system 118, a dispensing system 120 including a printer head, and a calibration device 122. The build plate 112 may be disposed below the dispensing system 120 and configured to provide a, e.g., planar and level, surface for 3D printing. In some implementations, the build plate 112 may be supported on a frame 200, e.g., by a kinematic coupling, to be removable and accurately replaced. In operation, the build plate 112 may translate vertically, e.g., in the z-axis, by a lead screw, ball nut, stepper motor, and the like (e.g., riding along vertically disposed metal rails using spaced brass or nylon bushings for low friction and ease of travel). An example of a commercially available 3D printer having such features is the Developer's Kit 3D Printer, available from Voxel8, Inc., based in Somerville, Mass. See also U.S. Patent Application Publication No. 2016/0193785 A1 (U.S. Ser. No. 14/986, 373), the disclosure of which is incorporated herein by reference in its entirety.

One of the sensors may be a liquid material sensor 116 adapted to determine a level of a liquid material disposed within the dispensing system 120. The liquid material sensor 116 may be, e.g., an optical sensor, a capacitive plate sensor, a Hall effect sensor, a linear or rotary encoder (optical, magnetic, etc.) and the like. As discussed in greater detail with reference to FIGS. 6A-6C, the Hall effect sensor may include a magnet portion that is disposable in a plunger that is adapted to register a surface of the liquid as the liquid is drawn down.

The multi-axis positioning system 118 may be motorized and adapted to position the dispensing system 120 and, more specifically, position dispensing tips of removable cartridges disposed in the dispensing system, in multiple axes, e.g., two or three axes, relative to the frame 200 and the build plate 112 reliably and repeatably. In some implementations, the multi-axis positioning system 118 moves the dispensing tips relative to the build plate 112 to position the dispensing tips and to dispense a heated filament or other build material in a programmed geometry and according to the head path-plan to create the printed object. An exemplary multi-axis positioning system is the ABG Gantry manufactured by Aerotech Inc., based in Pittsburgh, Pa.

Figure 3A:
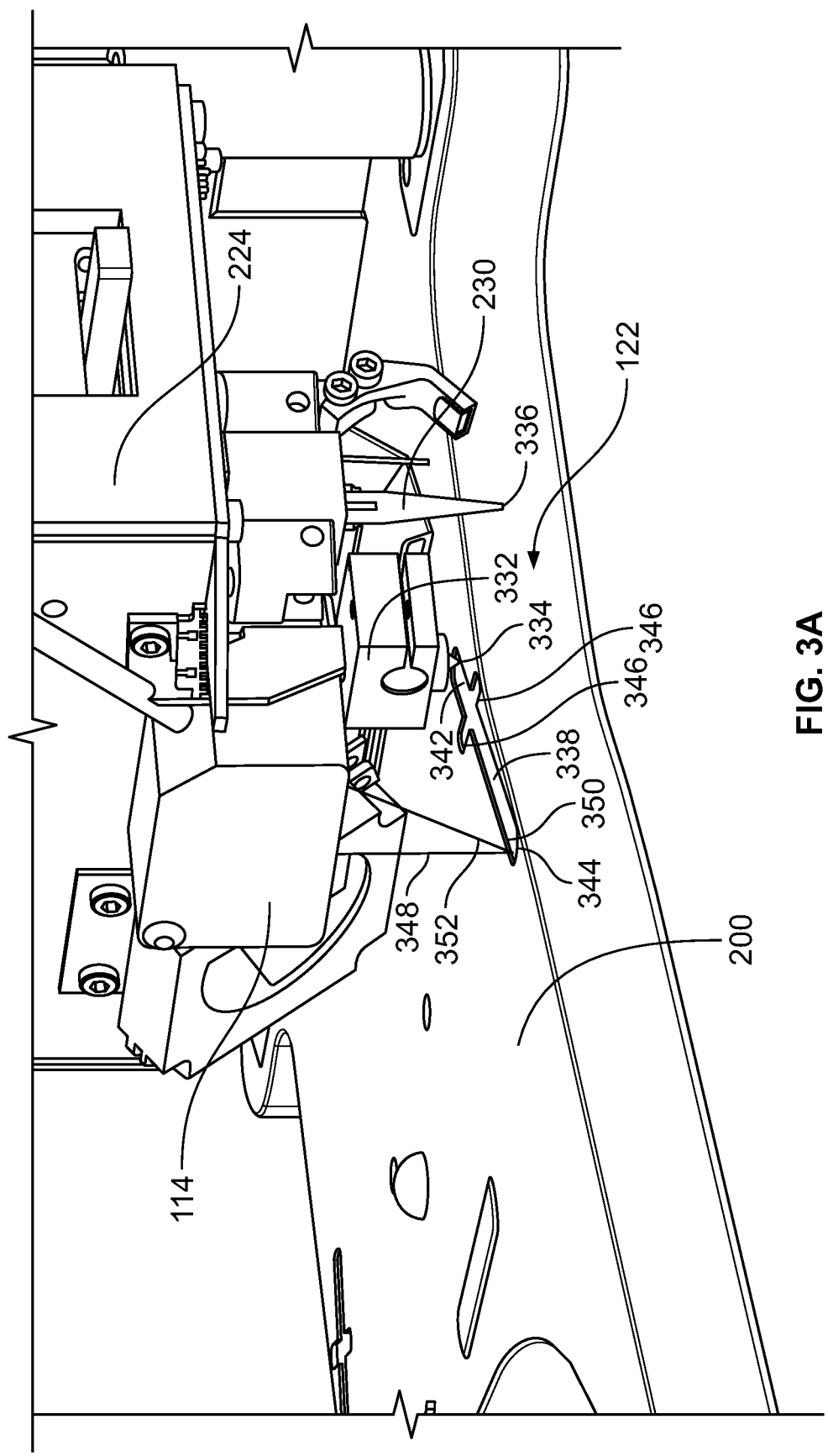
FIG. 3A is a perspective view of an illustrative embodiment of a dispensing system and a T-shaped lever of a calibration device for the 3D printer of FIG. 1.

Referring to FIGS. 2 and 3A, in some embodiments, the dispensing system 120 may include a cartridge holder 224 that is adapted to hold multiple, e.g., two, removable cartridges 226, 228 that may be adapted to retain and to supply materials for use in forming, e.g., by extrusion or dispensing, the 3D object. Suitable exemplary removable cartridges are EFD 3 CC, 5 CC, 10 CC syringes, or cartridges, available from Nordson Corporation, based in Westlake, Ohio.

In some implementations, each cartridge 226, 228 may include a hollow dispensing tip 230, 332 (also referred to herein as a nozzle) that is adapted to accurately deliver the extrudable or dispensable material via a corresponding opening 334, 336 at a distal end of the dispensing tip 230, 332. The dimensions of the openings 334, 336 and of the hollow dispensing tips 230, 332 may vary depending on the material being printed and the necessary precision of the build object, and may be readily selected by one of skill in the art.

A sensor 114, e.g., a proximity sensor, may be mounted at a location relative to the cartridge holder 224, e.g., on a front portion of the cartridge holder 224 between and above the dispensing tips 230, 332. The proximity sensor may be configured to allow the determination of the position of each of the dispensing tips 230, 332 in (x, y, z) space, as well as to detect features printed on the build plate. Accordingly, the proximity sensor 114 may be, e.g., a laser distance sensor (such as the HG-C1030 manufactured by the Panasonic Corporation of Osaka, Japan), a laser point sensor, a laser line sensor, a laser three-dimensional sensor, an optical imaging device, a charge coupled device (CCD) image sensor, a photodiode, a photoresistor, a phototransistor, a fluoride optical element, and so forth.

Figure 3B:
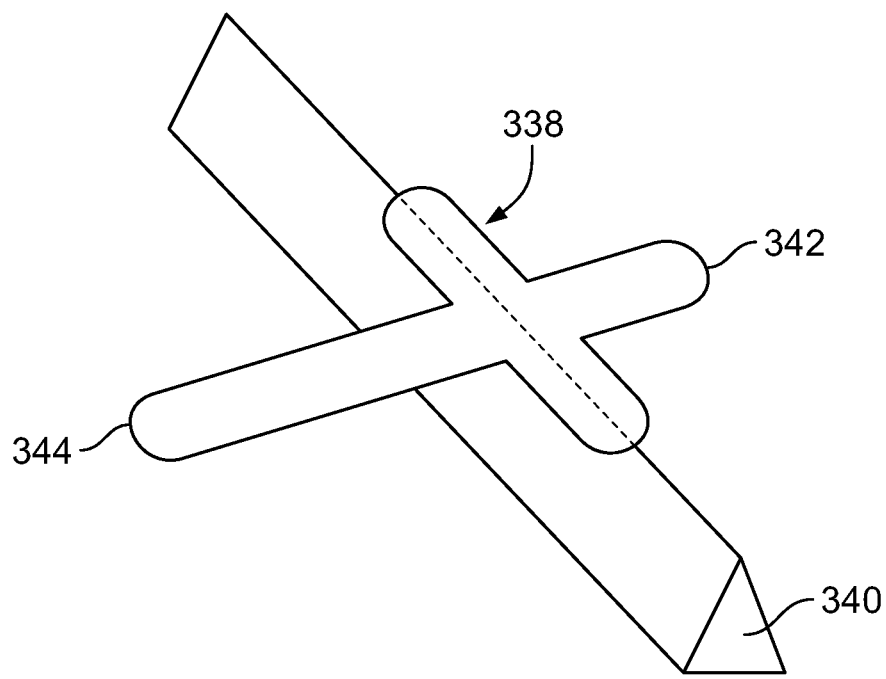
FIG. 3B is a perspective view of the T-shaped lever of FIG. 3A.

Referring to FIGS. 3A and 3B, in some implementations, a first calibration device 122 may be coupled to the frame 200. The first calibration device 122 may include an elongate lever 338 and a fulcrum 340 on which the lever 338 is balanced and about which the lever 338 may rotate upon application of a force or load to a first, proximal end 342 or to a second, distal end 344 of the lever 338. The fulcrum may be a point, an edge, an axle, etc. In some variations, the lever 338 and fulcrum 340 may be manufactured of wood, metal (e.g., aluminum, spring steel, brass, steel, and the like), a ceramic, a phenolic material, a plastic (e.g., acrylonitrile butadiene styrene (ABS), polyoxymethylene, a polycarbonate, and the like) and so forth. In various implementations, the lever 338 may be T-shaped (FIGS. 3A and 3B). The T-shaped lever 338 may include a first, proximal end 342 and a second, distal end 344, with a T-portion 346 disposed proximate the line or point of contact between the lever 338 and a fulcrum 340. The lever 338 may be scanned for flatness. When the lever 338 is mounted on the fulcrum 340, it may have a non-zero slope, which is preferably taken into account during calibration. In some implementations, the lever 338 may be from about 1 cm to 50 cm in length and/or width and range between about 0.1 mm to 20 mm in thickness. In some embodiments, the lever may be 3.18 mm thick. The lever 338 may be long enough such that both the laser point of the sensor 114 is aligned with the distal end 344 when the dispensing tip 332 comes into contact with proximal end 342. In some embodiments, the lever 338 may be longer. The lever 338 is preferably not so small that either of the distal or proximal ends 342, 344 do not align with the laser point and the dispensing tip 332. As depicted in FIG. 3A, the incident beam 348 may be reflected 352 off the distal end 344 of the lever 338 at about a 30° angle.

Figure 3C:
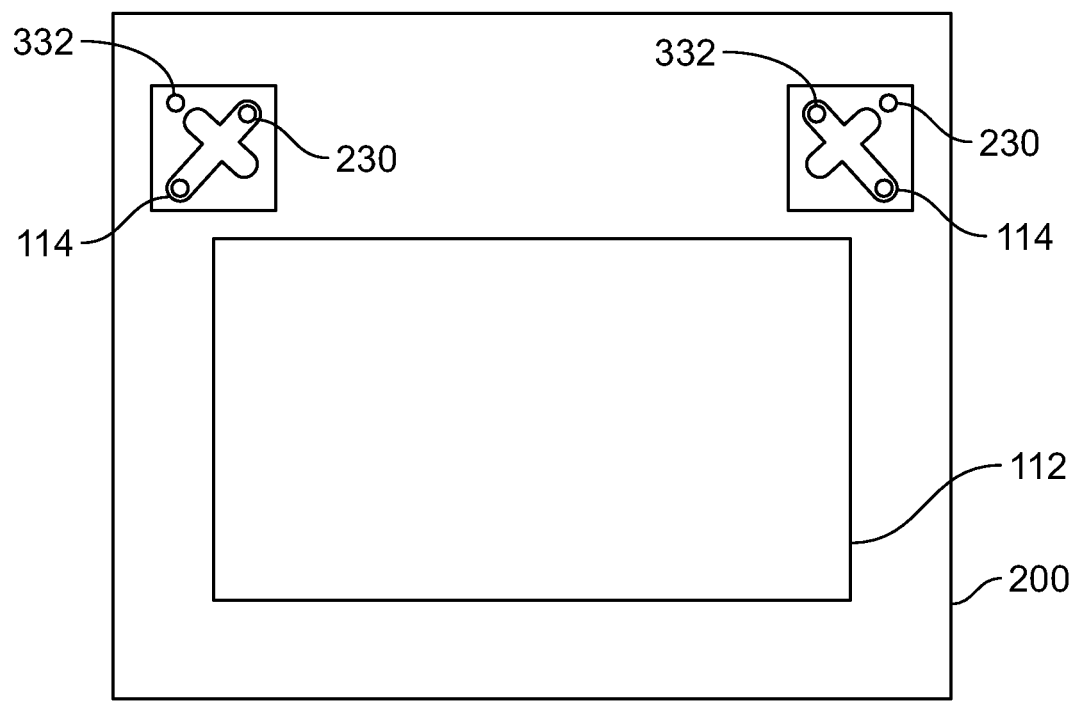
FIG. 3C is a top view of two calibration devices disposed in a frame in accordance with an embodiment of the present invention.

Referring also to FIG. 3C, in some embodiments, an opening 350 for receiving the lever 338 may be formed in the frame 200 at a location remote from the working volume of the build plate 112, thereby enabling calibration with the build plate 112 installed on the frame 200. In some embodiments, the opening 350 may be 4 mm deep. The lever 338 may sit above, below, or flush with the opening 350 in the frame 200. The opening 350 is formed to allow lever 338 enough clearance space to move freely and to pivot on the fulcrum 340. In embodiments with multiple dispensing tips 230, 332, one or more additional calibration devices 122 may be provided, such that each calibration device 122 may be dedicated to a discrete dispensing tip 230, 332 or all can be calibrated with a single device 122. In an exemplary configuration, a first calibration device may be coupled to the frame such that, in a calibration position of the dispensing system 120, the first dispensing tip 332 is disposed in registration with a proximal end of the lever and the sensor is disposed in registration with a distal end of the lever. A second calibration device may be coupled to the frame 200 such that, in a second calibration position of the dispensing system 120, the second dispensing tip 230 is disposed in registration with a proximal end of the second lever and the sensor is disposed in registration with a distal end of the second lever.

Figure 3D:
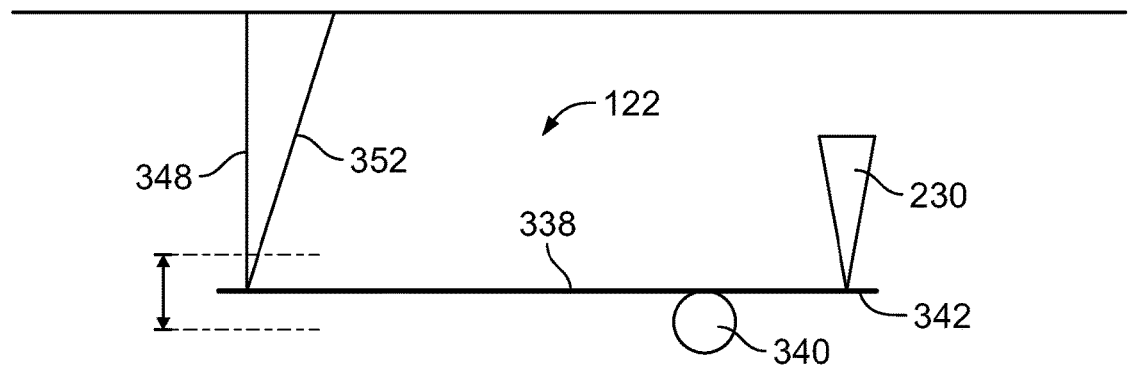
FIGS. 3D and 3E are graphics illustrating operation of a lever and fulcrum calibration system in accordance with one embodiment of the present invention.
Figure 3E:
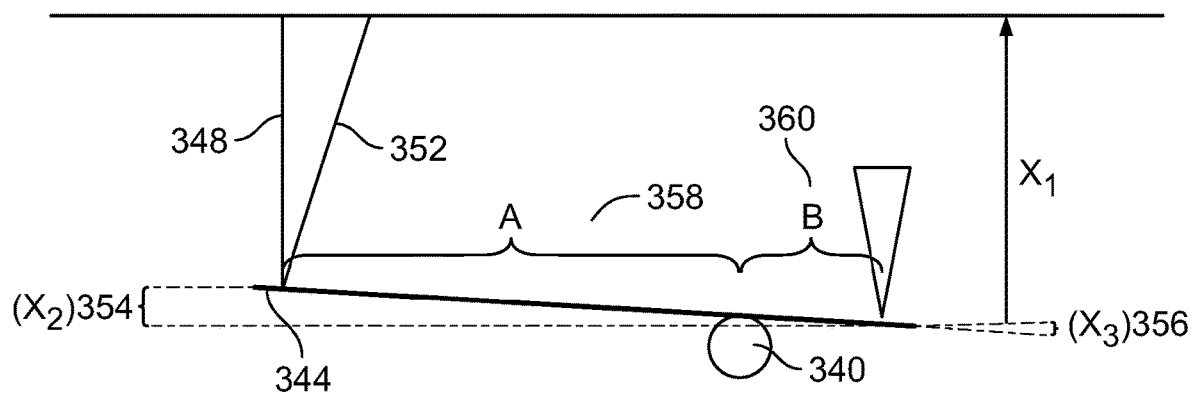

Referring also to FIGS. 3D and 3E, as discussed in detail below, in use, displacement of the lever 338 by the dispensing tip 230, 332 may be measured by use of an incident beam 348 emitted by the sensor 114, which may be reflected from the surface of the distal end 344 of the lever 338 and the reflected beam 352 may be captured by the sensor 114. Accordingly, the disclosed calibration devices allow one to obtain measurements necessary to calibrate and align the printing heads. The calibration device can be used to measure an initial distance $X_1$ of the sensor 114 to a proximal end 342 of the lever 338, and facilitate the determination of a rise 354 ($X_2$) of the distal end 344 of the lever, based on a distance change 356 ($X_3$) of the proximal end 342 of the lever 338 after contact with the dispensing tip 230. Taking into consideration the distances 358, 360 of the proximal and distal ends of the lever from the fulcrum, the spatial location of the dispensing tip 230 can be calculated.

Figure 4:
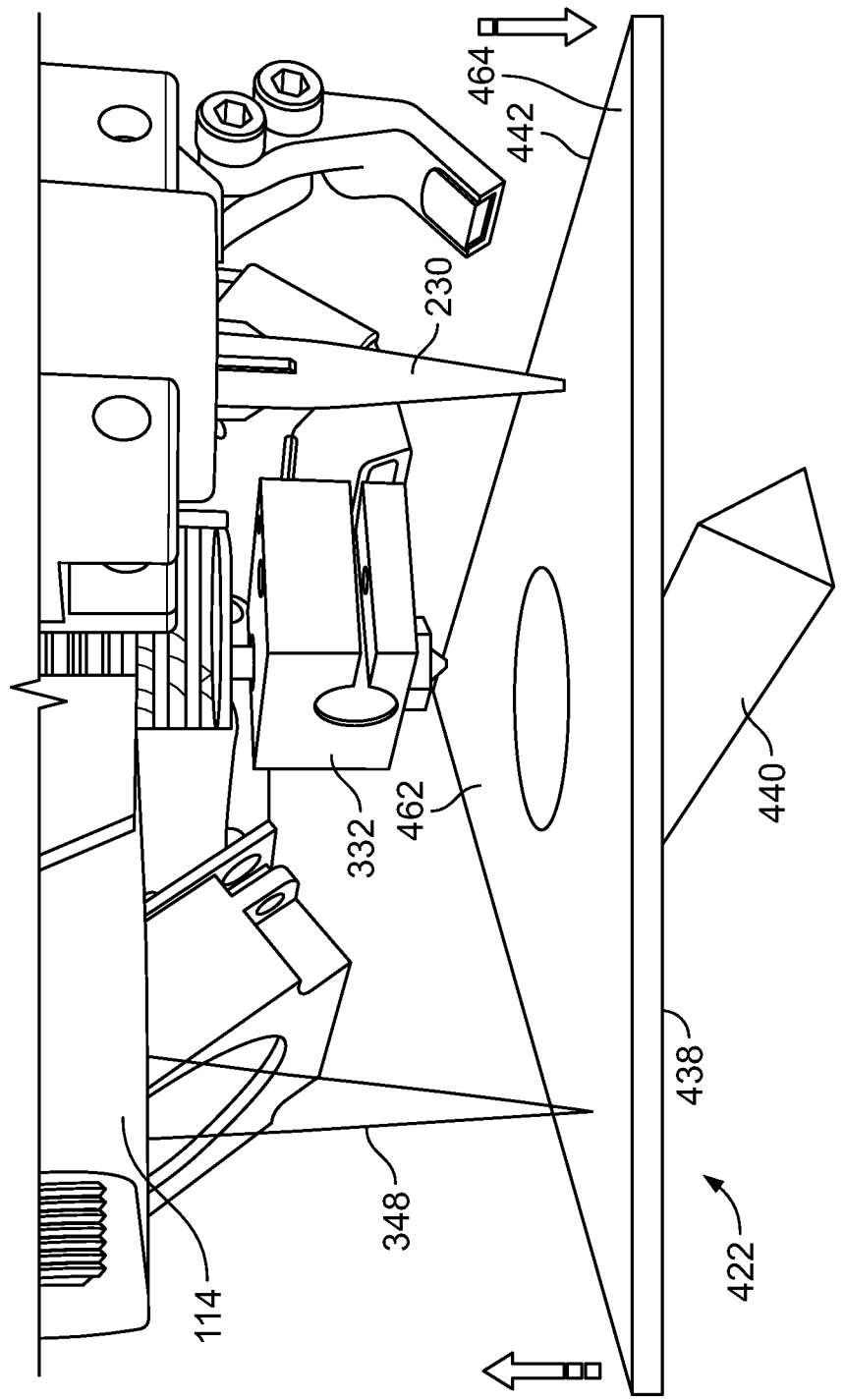
FIG. 4 is a perspective view of an illustrative embodiment of an alternative, polygonal-shaped lever for a calibration device for the 3D printer of FIG. 1.

Referring to FIG. 4, the first calibration device 422 may include a lever 438 that is polygonal—(e.g., triangular-) shaped. A triangular-shaped lever 438 may be disposed over the fulcrum 440 and may include a first position 462 and a second position 464 disposed along the first, proximal end 442 of the lever 438, so as to be concurrently alignable with a pair of corresponding dispensing tips 230, 332. In a first calibration position, a first dispensing tip 332 may contact the first position 462 on the lever 438. In a second slightly offset calibration position, the second dispensing tip may contact a second position 464 on the lever 438. The same sensor 114/incident beam 348 enables the calibration of both dispensing tips 230, 332. Accordingly, a single sensor may be used to calibrate more than one dispensing tip, by contacting the lever 438 sequentially with each tip, while the sensor beam 348 remains aligned with a distal end of the lever 438.

Figure 5:
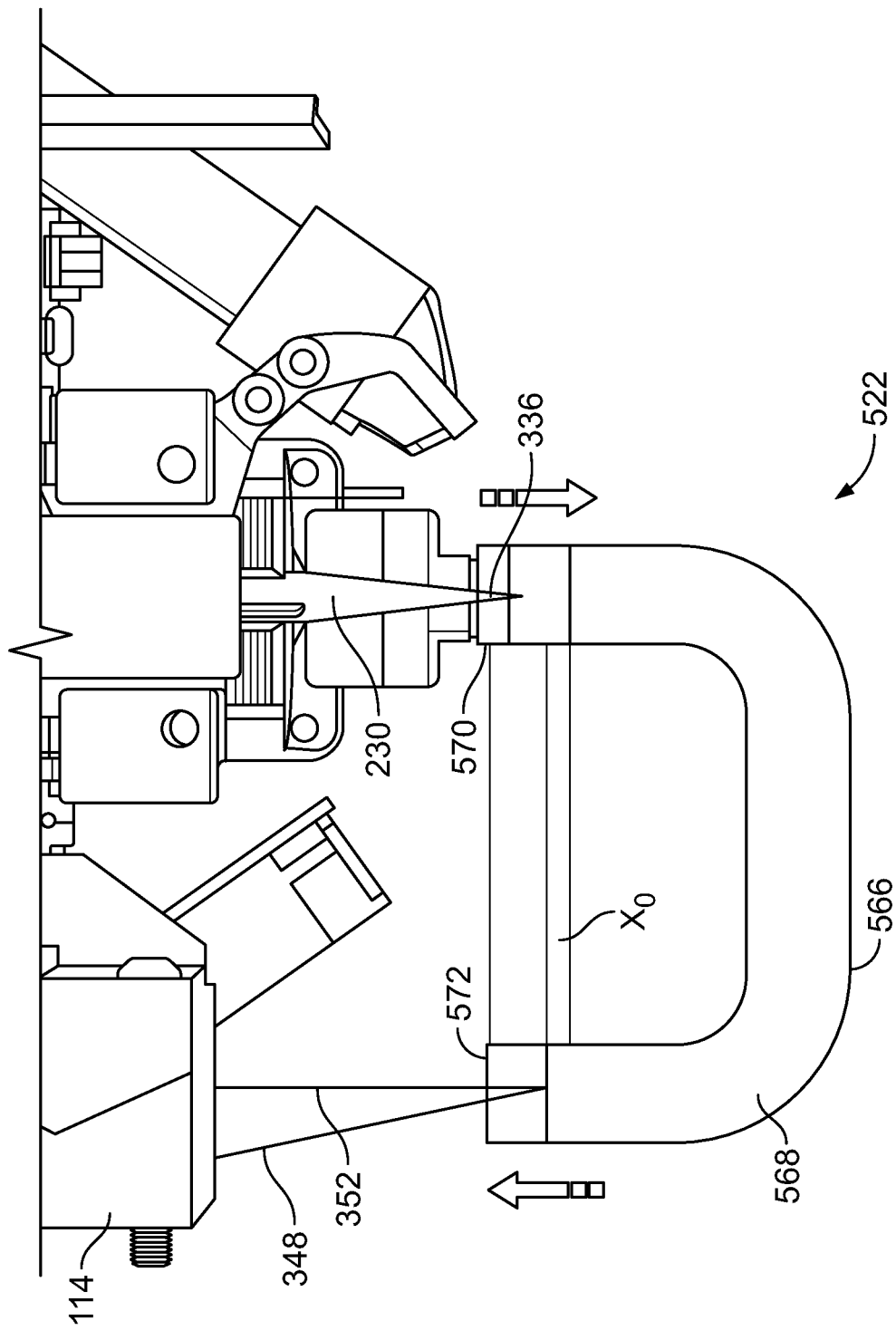
FIG. 5 is a side view of an illustrative embodiment of an alternative, fluid-based calibration device for the 3D printer of FIG. 1.

In an alternative embodiment, referring to FIG. 5, the calibration device 538 may include a U-shaped fluid tube 566 configured to contain a viscous, displaceable fluid 568, e.g., glycol. In some implementations, the U-shaped fluid tube 566 defines a first open end 570 disposed to align and be in registration with a dispensing tip 230, 332 and a second open end 572 disposed to align and be in registration with the sensor 114. In operation, application of a force or load to the fluid at the first open end 570 causes displacement of the fluid 568, resulting in a measureable change in elevation of the fluid 568 at the second open end 572. A suitable sealing plug or insert can be provided to the first open end 570 and/or the second open end 572 to ensure displacement of the fluid 568.

Figure 6A:
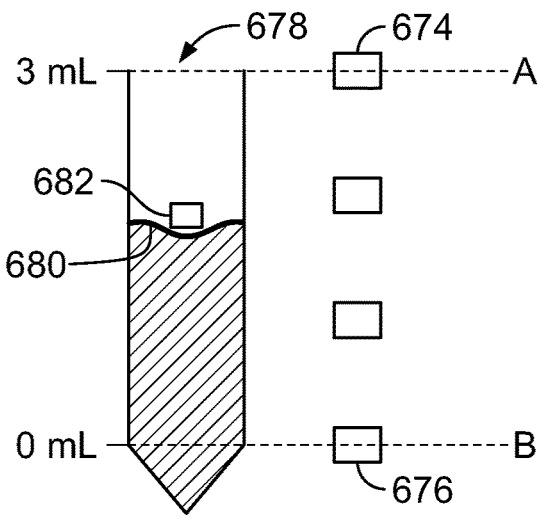
FIG. 6A is a side view of a liquid level measurement system using Hall effect sensors in one embodiment of the invention.

Some embodiments may include a liquid material sensor adapted to determine a level of a liquid material used for printing that is disposed within a fluid reservoir in the dispensing system, e.g., in a cartridge or syringe. Referring to FIG. 6A, the liquid material sensor may be a series of Hall effect sensors 674, 676 placed adjacent to a syringe 678 or cartridge containing the fluid 668 to be dispensed. In this embodiment, the plunger 680 of the syringe 678 contains a magnet 682. As the plunger 680 is pushed down to dispense the fluid 668, the sensor closest to the magnet 682 detects a peak in the magnetic field.

Figure 6B:
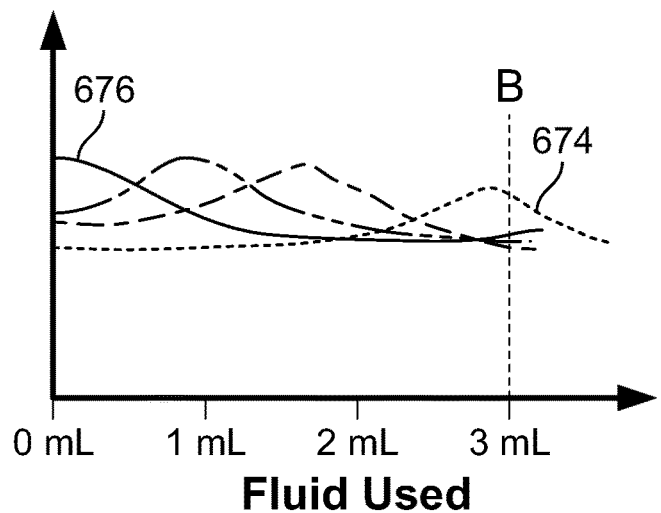
FIG. 6B is a graph of exemplary data from a series of Hall effect sensors used to measure the level of liquid in a fluid reservoir.

FIG. 6B shows a graph of exemplary data from a series of Hall effect sensors, as referenced in FIG. 6A, adapted to determine the level of a liquid material disposed within the fluid reservoir. At position A, the syringe 678 contains 3 mL of fluid 668. When the plunger 680 is at position A, the magnet 682 in the plunger 680 is aligned with the first Hall effect sensor 674. As shown in the exemplary graph, this corresponds to a peak in the sensor output. At position B, the syringe 678 contains essentially 0 mL of useable fluid 668. When the plunger 680 is at position B, the magnet 682 within the plunger 680 is aligned with the last Hall effect sensor 676, corresponding to a peak at position B on the exemplary graph. As displayed on the exemplary graph, as the magnet 682 in the plunger 680 passes each respective Hall effect sensor, a peak occurs in the measurement of the magnetic field.

Figure 6C:
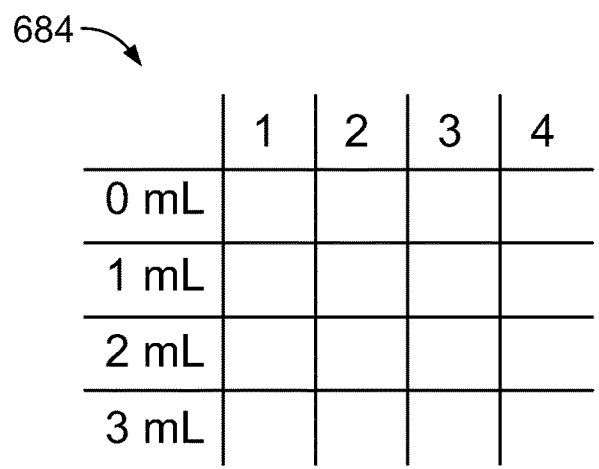
FIG. 6C is an illustration of a matrix that may be used as in an encoder to correlate values from a series of Hall effect sensors to levels of liquid in a fluid reservoir.

FIG. 6C shows an exemplary matrix 684 that may be used to encode the measurements from the series to Hall effect sensors to various liquid levels. By knowing the magnetic field measurement of each Hall effect sensor at each plunger position it is possible to calculate the amount of liquid in the dispensing system.

Figure 7A:
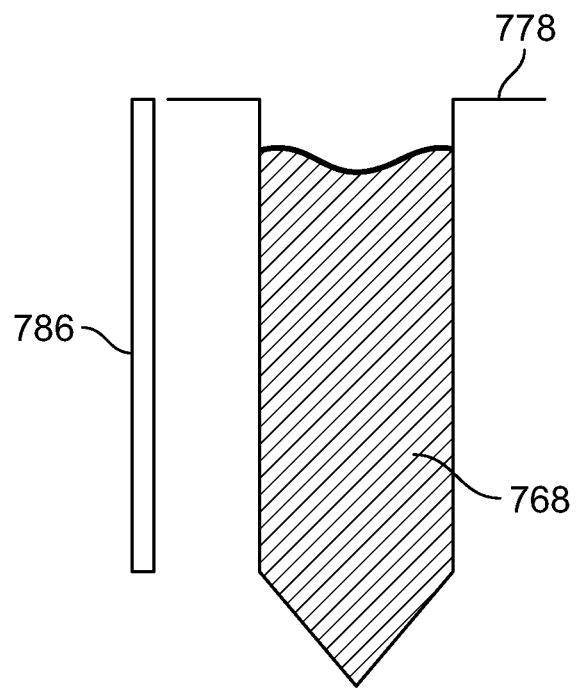
FIG. 7A is a side view of an embodiment of a liquid level measurement system using a capacitive plate sensor to detect the level of liquid in a fluid reservoir.

In another embodiment the liquid material sensor adapted to determine a level of a liquid material disposed within a cartridge or syringe in the dispensing system may be a capacitive plate sensor. FIG. 7A is an illustration of a capacitive plate sensor 786 disposed adjacent to a syringe 778 containing a fluid 768. The capacitive plate 786 may be made of conductive material, such as copper or aluminum, and may be an appropriate size for detecting changes in capacitance, e.g., 1 mm×1 mm. The capacitive plate sensor may be flat or it may be wrapped around the syringe 778. As the level of fluid within the syringe 778 changes, the capacitance of the plate 786 changes. In an alternative embodiment, a capacitive wire is used to determine the level of a liquid material disposed within the dispensing system. The capacitive wire may be formed of any conductive material, e.g., copper or aluminum, and may preferably be 8-60 gauge.

Figure 7B:
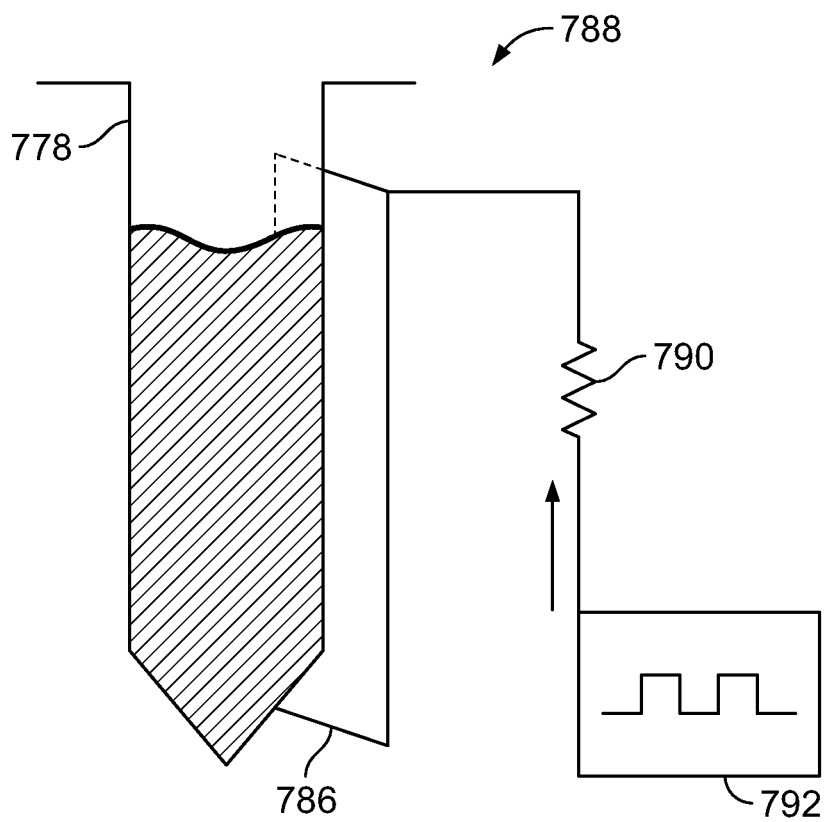
FIG. 7B is a schematic of an exemplary circuit employing a capacitive plate sensor to detect the level of liquid in a fluid reservoir.
Figure 8:
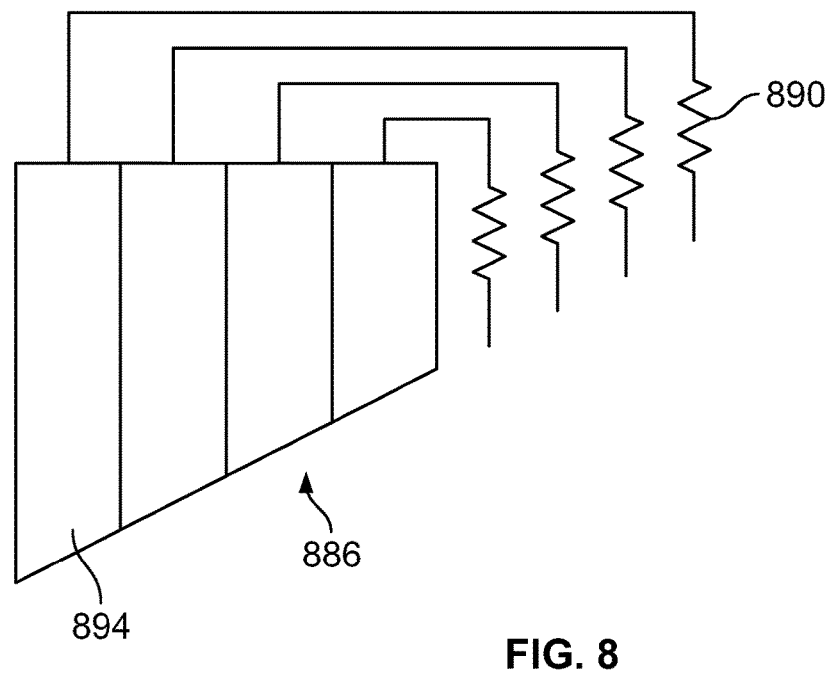
FIG. 8 is an illustration of an alternative embodiment of a capacitive plate sensor.

FIG. 7B is an exemplary circuit 788 in which the capacitive plate 786 is connected in series to a resistor 790. In some embodiments the resistor 790 may be 1 kΩ-1 MΩ. In some embodiments a microcontroller 792 is adapted to feed a square wave through the circuit 788. Suitable microcontrollers are, e.g., ATtiny84A from Atmel Corporation or PSoC 4200 from Cypress Semiconductor, both based in San Jose, Calif. A measurement is taken that measures how long it takes the current to reach the peak maximum current fed into the circuit 788 by the microprocessor 792. The time it takes to reach this peak value is directly related to the capacitance of the capacitive plate by the following equation:

$$C = -\frac{t}{R * \ln\left(1 - \frac{V_{pk}}{V_{cc}}\right)}$$

where C is the capacitance of the capacitive plate 786, t is time, R is the resistance of the resistor 790, $V_{pk}$ is the peak voltage as measured at a point in the circuit, and $V_{cc}$ is the power supply voltage. By knowing the time it takes to reach the peak current, it is possible to know the level of fluid, since the level of fluid directly affects the plate capacitance.

In another embodiment, the capacitive plate may have several electrically isolated sections with different capacitances, e.g., a flat flexible cable. Capacitance is related to area by the following equation:

$$C = \frac{\varepsilon A}{d}$$

where A is the area of overlap between the capacitive plate and the liquid surface, ε is the permittivity, and d is the distance between the two capacitive plates, or between the plate and the liquid surface. As shown in Fla 8, each section 894 has a different area, which changes the capacitance of each section of the capacitive plate 886. Each section is respectively connected in series with a resistor 890 and functions as described above. An advantage of this embodiment is that it subtracts the system error from the measurement of the liquid level.

Figure 9:
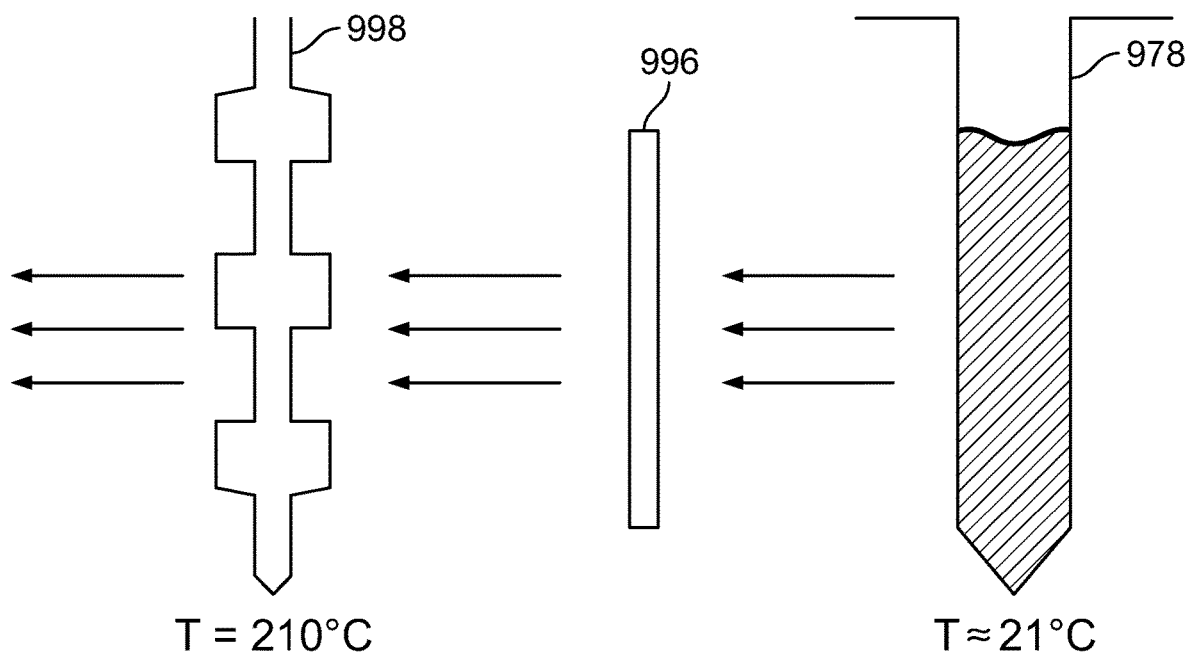
FIG. 9 is an illustration of a heat removal device for cooling a liquid dispensing system.

Some embodiments of a 3D printer may include a heat removal device for cooling the liquid dispensing system. FIG. 9 depicts a blower fan 996 that blows air away from a syringe 978 containing liquid that may dry or clot at high temperatures. In some embodiments the syringe 978 may be kept at about room temperature, e.g., 21° C. The fan 996 keeps warmer air away from the first syringe 978 and in the vicinity of a second dispensing tip 998. The second dispensing tip 998 may contain a fluid or filament that is dispensed at a higher temperature. In some embodiments the temperature of the second dispensing tip 998 may be 210° C. The inclusion of the fan 996 facilitates the extrusion of fluid in the first syringe 978, without adversely impacting dispensing of fluid from the second dispensing tip 998.

Method of Calibrating and Aligning Dispensing Tips of a 3D Printer

Referring again to FIG. 2, in instances in which the 3D printer 100 includes the dispensing system 120 that includes multiple, e.g., two, dispensing tips 230, 332 that are offset with respect to each other, each dispensing tip 230, 332 can be aligned with respect to the (x, y, z) working volume of the build plate 112. Advantageously, the sensor 114 may be used to determine an (x, y, z) offset from nominal position, to acquire point distance measurements, to level the build plate 112, to determine the cross-sectional area of extruded filaments for materials calibration, to determine the center point of each dispensing tip 230, 332, to scan a material trace, to find the tip-to-tip distance in the z-axis, and so forth.

Figure 10A:
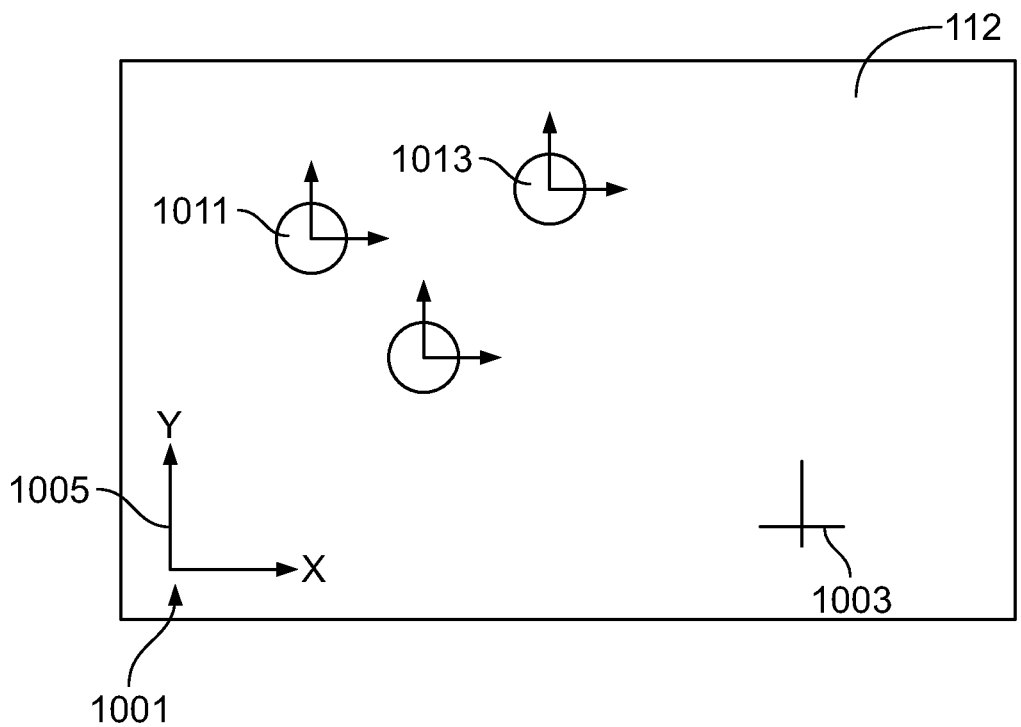
FIG. 10A is a graphic of a method for determining the (x, y) offset of a dispensing tip or nozzle in accordance with some embodiments of the present invention.

For example, referring to FIGS. 10A and 11, a method 1100 for determining the (x, y) center of a dispensing tip may be executed as follows. To accurately determine the (x, y) positioning of multiple dispensing tips 230, 332 relative to the global coordinate system 1001 of the build plate 112, a sample object or feature 1003 may be placed or printed on the build plate 112 (STEP 1110) at some distance from an origin 1005 of the global coordinate system 1001. The proximity sensor 114, e.g., a laser distance sensor (such as the HG-C1030 manufactured by the Panasonic Corporation of Osaka, Japan), a laser point sensor, a laser line sensor, a laser three-dimensional sensor, an optical imaging device, a charge coupled device (CCD) image sensor, a photodiode, a photoresistor, a phototransistor, a fluoride optical element, and so forth, may be positioned above, so as to align and be in registration with the sample object 1003 (STEP 1120). With the sensor 114 so aligned relative to the origin 1005 of the global coordinate system 1001 of the build plate 112, in a next step, each dispensing tip 230, 332 may place or print, e.g., extrude, an object or trace 1011, 1013 on the build plate 112 (STEP 1130). The trace 1011, 1013 may be any two-dimensional feature. For example, in some implementations, for the purpose of illustration and not limitation, the trace 1011, 1013 may be X-shaped, cross-shaped (+), L-shaped, L-shaped but rotated 90 degrees, and so forth. L-shaped traces 1011, 1013 are depicted in FIG. 10A.

Figure 10B:
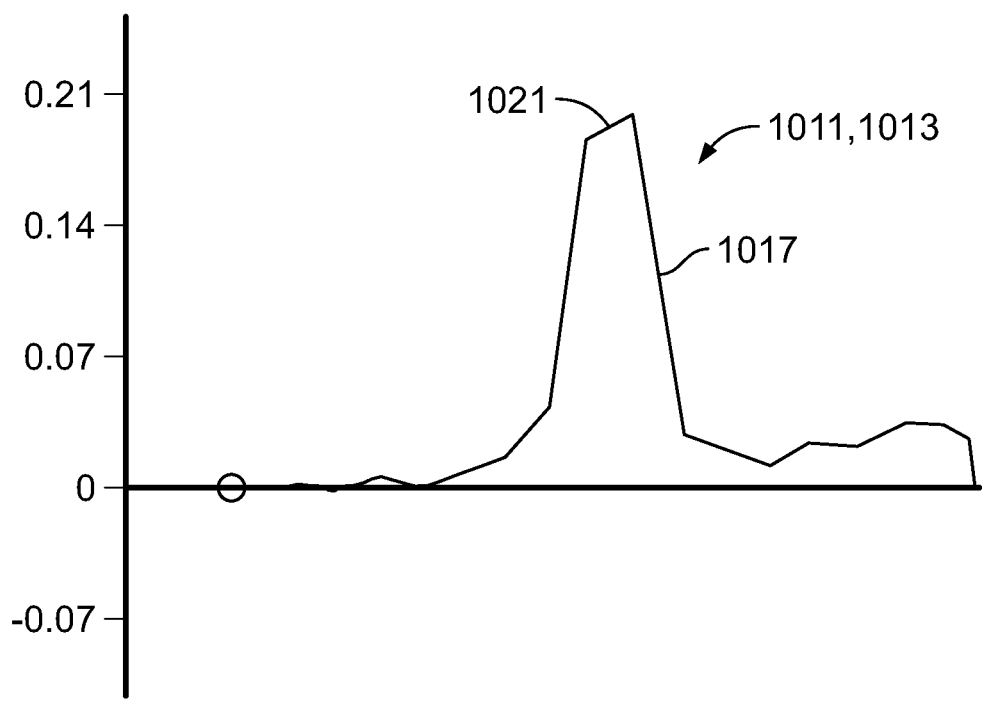
FIG. 10B is a graphic of a two-dimensional profile of a trace in accordance with some embodiments of the present invention.

Referring to FIG. 10B, each extruded trace 1011, 1013, i.e., printed object, includes, in each of an x- and a y-direction, a cross-sectional material profile 1017. In some embodiments, to determine the x- and y-coordinates of the center of the dispensing tip 230, 332, the sensor 114 may optically scan the material profile 1017 (STEP 1140) to locate a center of the printed trace (STEP 1150), corresponding to the center of the respective opening 334, 336 of each dispensing tip 230, 332. More particularly, as the sensor 114 optically scans the material profile 1017 of the printed trace 1011, 1013 in one axis, e.g., a y-direction, substantially perpendicular to one line of the trace 1011, 1013, the tip center 1021 for the x-coordinate may be determined, e.g., at a maximum height of the material profile 1017, while as the sensor 114 optically scans the material profile 1017 of the other line of the printed trace IOU, 1013 in a second axis, e.g., a x-direction, substantially perpendicular to the trace 1011, 1013, the tip center 1021 for the y-coordinate may be determined, e.g., at a maximum height of the material profile 1017.

As alternatives to determining the (x, y) position of the dispensing tips 230, 332 using the maximum height of the material profile 1017, the (x, y) position may be determined by calculating a center of mass of the material profile 1017, by an edge-finding technique, and the like. For example, in some variations, with the edge-finding technique, the sensor 114 may optically scan the material profile 1017 of the printed trace 1011, 1013 in one axis, in one direction, substantially perpendicular to the trace 1011, 1013. When the sensor 114 first encounters an edge of the trace 1011, 1013, height readings increase suddenly and significantly and the location of the sensor 114 when the jump occurs may be recorded. The sensor 114 may then optically scan the material profile 1017 of the printed trace 1011, 1013 along the same axis, substantially perpendicular to the trace 1011, 1013, but in an opposite direction, starting from the opposite side of the trace 1011, 1013. Once again, when the sensor 114 first encounters an edge of the trace 1011, 1013 coming from the opposite direction, the location of the sensor 114 when the jump occurs may be recorded. The recorded position data may be provided to the processing device 102, which may be configured to divide the mathematical difference between the two points by two to determine the center of the trace 1011, 1013. In yet another alternative, the generated sensor data may be used to generate a material profile 1017 curve and the processing device 102 may be configured to integrate along the curve to determine the area under the curve, as well as the center point.

Once the (x, y) offsets of the centers 1021 of each material profile 1017 and dispensing tip 230, 332 are determined, e.g., for each leg of the L-shape, with respect to the sensor 114, the (x, y) offsets of the centers 1021 may be aligned with respect to the origin 1005 of the global coordinate system 1001. Advantageously, this enables automatic, precise alignment of the dispensing tips 230, 332 on the build plate 112, until the cartridges 226, 228 require replacement and, accordingly, (x, y) alignment can be repeated to account for any change in the offset of the dispensing tip 230, 332 of each new replacement cartridge 226, 228.

Referring to FIGS. 3A, 3B, 3D, 3E, and 12, a method 1200 allows the determination of tip-to-tip (z) height difference between a dispensing tip and a sensor. In particular, in some embodiments, to accurately calibrate the tip-to-tip (z) height offset (also referred to as vertical offset) of each dispensing tip 230, 332 with respect to the sensor 114, a selectively translatable first dispensing tip 230 may be aligned above, so as to be in registration with, a proximal end 342 of the lever 338 of the calibration device 122, while the sensor 114, which may be fixedly attached to the cartridge holder 224, may be aligned above, so as to be in registration with, a distal end 344 of the lever 338 of the calibration device 122 (STEP 1210). In this position, the fixed sensor 114, e.g., a laser distance device, may measure an initial distance ($X_1$) from the tip of the sensor 114 to the distal end 344 of the lever 338 (STEP 1210). The first dispensing tip 230 may then be lowered a measured distance in a z-direction until the end of the dispensing tip 230, e.g., the opening 334, contacts the proximal end 342 of the lever 338 (STEP 1220), causing the distal end 344 of the lever 338 to rise a distance 354 ($X_2$) about the fulcrum 340. For example, an incident beam 348 emitted by the sensor 114 may be reflected from the surface of the distal end 344 of the lever 338 and the reflected beam 352 may be captured by the sensor 114, from which a change in distance 354, i.e., the rise of the lever 338 ($X_2$), caused by the contact of the dispensing tip 332 at the proximal end 344 about the fulcrum 340 may be determined (STEP 1230).

The distance change 354 ($X_2$) measured by the sensor 114 (STEP 1230) may be used to calculate the distance change 356 ($X_3$) of the proximal end 342 about the fulcrum 340 (STEP 1240). For example, using the identity of congruency, the sensed distance change 354 ($X_2$) at the distal end 344 is proportional to the distance change 356 ($X_3$) at the proximal end 342 in accordance with the ratio of the fulcrum 340 position, i.e., A:B. Hence, $A:B = X_2:X_3$, hence $X_3 = B/A * X_2$.

The (z) offset calibration between the tip of the sensor 114 and the tip or opening 334 of the first dispensing tip 332 may be determined (STEP 1250), for example, using the following equation:

Tip-to-tip distance calibration=$X_1 + X_3$.

The same procedure may be used to determine the tip-to-tip (z) height offset of the second dispensing tip 332 with respect to the sensor 114. Once the sensor 114 is used to ascertain the (z) distance from the tip of the sensor 114 to the surface of the build plate 112, the distances from the tips or openings 334, 336 of the dispensing tips 230, 332 to the surface of the build plate 112 may be readily calculated. With this technique, the (x, y) locations of the dispensing tips 230, 332 are known prior to calibration. Those of ordinary skill in the art can appreciate that the same procedure also may be followed to determine the tip-to-tip (z) height offset if a single calibration device 122 (FIG. 4) is used to calibrate both dispensing tips 230, 332 and/or if a liquid-based calibration device(s) 122 (FIG. 5) is used to calibrate both dispensing tips 230, 332.

Alternatively, in another embodiment, the tip or opening 334 may be raised and lowered in small increments so that the slightest contact of the dispensing tip 332 may be detected by the sensor 114 before the lever 338 rises about the fulcrum 340 at the distal end 344 of the lever 338. Advantageously, with this approach, the x, y) locations of the dispensing tips 230, 332 do not need to be known in advance.

Method of Calibrating Material Flow

During printing operations, the amount of material flowing out of or extruded by the dispensing tip 230, 332 is an important quality control parameter. Indeed, when using feedstock, such as a thermoplastic filament, the diameter of the feedstock may be non-conforming to the specifications, resulting in over-pumping (too large) or under-pumping (too small) the printing job. Hence, it may be desirable to be able to calibrate material flow during printing, i.e., on-the-fly, so as to be able to correct the dwell time and/or flow quantity during extrusion.

Referring to FIG. 13 and FIG. 10B, a method 1300 for adjusting material flow during a printing operation is described. Each extruded trace 1011, 1013, i.e., each object printed on the build plate, includes, in each of the x- and y-directions, a material profile 1017. In some embodiments, instead of using the sensor 114 to determine the x- and y-coordinates of the center of the dispensing tip 230, 332, the sensor 114 mounted on the dispensing system may be used to optically scan, e.g., generate a material profile 1017, of the trace 1011, 1013 (STEP 1310) and to determine the area of the trace 1011, 1013 (STEP 1320). The determined area may be compared to an expected cross-sectional area (STEP 1330). Depending on whether the area of the actual trace is greater or less than the expected cross-sectional area, the printing/extrusion process may be adjusted (1340) and, more particularly, may be adjusted on-the-fly, without having to stop or interrupt the 3D printing operation. Similarly, scanning the object may include determining a thickness of the object and comparing the determined thickness to an expected thickness. Printing, scanning, and comparing steps may be repeated until the determined thickness of the scanned object equals the expected thickness within a predetermined tolerance, e.g., ±0.25%, ±0.5%, ±1%, ±1.5%, ±2%, ±2.5%, etc.

Those skilled in the art will readily appreciate that all parameters listed herein are meant to be exemplary and actual parameters depend upon the specific application for which the methods, materials, and apparatus of the present invention are used. It is, therefore, to be understood that the foregoing embodiments are presented by way of example only and that, within the scope of the appended claims and equivalents thereto, the invention may be practiced otherwise than as specifically described. Various materials, geometries, sizes, and interrelationships of elements may be practiced in various combinations and permutations, and all such variants and equivalents are to be considered part of the invention.

What is claimed is:

1. A method for calibrating a three-dimensional printer comprising a frame, a first calibration device coupled to the frame, a dispensing system comprising a first dispensing tip, and a sensor, the method comprising:
   positioning the first dispensing tip in registration with a first end of the first calibration device;
   positioning the sensor in registration with a second end of the first calibration device;
   depressing the first end of the first calibration device with the first dispensing tip;

sensing with the sensor a change in vertical position of the second end of the first calibration device; and determining a vertical working height of the first dispensing tip.

2. The method of claim 1, wherein the three-dimensional printer further comprises a second calibration device coupled to the frame and the dispensing system further comprises a second dispensing tip, the method further comprising:

positioning the second dispensing tip in registration with a first end of the second calibration device;

positioning the sensor in registration with a second end of the second calibration device;

depressing the first end of the second calibration device with the second dispensing tip;

sensing with the sensor a change in vertical position of the second end of the second calibration device; and determining a vertical working height of the second dispensing tip.

3. The method of claim 2, wherein the first calibration device and the second calibration device comprise a single calibration device.

4. The method of claim 2, further comprising determining a relative vertical (z) offset distance between the first dispensing tip and the second dispensing tip.

* * * * *